United States Patent
Kim et al.

(10) Patent No.: US 6,824,270 B2
(45) Date of Patent: Nov. 30, 2004

(54) SINGLE-PANEL COLOR IMAGE DISPLAY APPARATUS AND SCROLLING METHOD

(75) Inventors: Sung-ha Kim, Gyeonggi-do (KR); Kun-ho Cho, Gyeonggi-do (KR); Dae-sik Kim, Gyeonggi-do (KR); Ju-seong Hwang, Chungcheongnam-do (KR); Hee-joong Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/648,829

(22) Filed: Aug. 27, 2003

(65) Prior Publication Data

US 2004/0130684 A1 Jul. 8, 2004

(30) Foreign Application Priority Data

Aug. 29, 2002  (KR) ................. 10-2002-0051523

(51) Int. Cl.[7] .................. G03B 21/14; G03B 21/28; G03B 21/20; F12V 9/00; H04N 9/12

(52) U.S. Cl. ............... 353/31; 353/84; 353/99; 353/102; 348/742; 348/760; 362/293

(58) Field of Search .................. 353/30, 31, 34, 353/37, 84, 99, 102; 349/5, 7, 8; 348/742, 759, 760; 362/293

(56) References Cited

U.S. PATENT DOCUMENTS 5,845,981 A * 12/1998 Bradley ................. 353/31
6,588,906 B2 * 7/2003 Hwang ................. 353/31
6,619,802 B2 * 9/2003 Janssen et al. .......... 353/31

* cited by examiner

Primary Examiner—Judy Nguyen
Assistant Examiner—Melissa J Koval
(74) Attorney, Agent, or Firm—Staas & Halsey LLP

(57) ABSTRACT

A single-panel color image display apparatus realizing a wide color gamut is provided. The single-panel color image display apparatus includes a colored light separator having a plurality of dichroic filters in which a dichroic filter reflecting a red light beam may be disposed lastly among the plurality of dichroic filters. The single-panel color image display apparatus may include a scrolling unit having a mask at a boundary portion between spiral lens cells.

18 Claims, 4 Drawing Sheets

SINGLE-PANEL COLOR IMAGE DISPLAY APPARATUS AND SCROLLING METHOD

CROSS-REFERENCE TO RELATED APPLICATION

This application claims the benefit of Korean Patent Application No. 2002-51523, filed on Aug. 29, 2002, in the Korean Intellectual Property Office, the disclosure of which is incorporated herein by reference.

BACKGROUND OF THE INVENTION

1. Field of the Invention

The present invention relates to a single-panel color image display apparatus, and more particularly, to a single-panel color image display apparatus having a wide color gamut.

2. Description of the Related Art

Color image display apparatuses of a projection type form an image by controlling the on/off operation of light emitted from a high-output lamp light source on a pixel-by-pixel basis using a micro display (also termed a light valve) such as a liquid crystal display (LCD) or a digital micro device (DMD), and magnify and project the image using a projection optical system, thereby providing a wide screen display. Color image display apparatuses of a projection type are classified into a three-panel type and a single-panel type according to the number of panels of micro display.

In a typical single-panel color image display apparatus, white light irradiated from a white light source is separated into red, green, and blue light beams using a color wheel, and the three colored light beams are sequentially sent to one micro display. The micro display operates according to the sequence of colors received and forms an image.

As described above, the typical single-panel color image display apparatus has a simpler structure and a smaller optical system than a three-panel color image display apparatus which forms color images on three micro displays using an optical separation/combination system. However, the typical single-panel color image display apparatus has a light efficiency equal to about one-third of that of the three-panel color image display apparatus due to the use of the color wheel. Hence, a single-panel color image display apparatus which includes a colored light separator having three dichroic filters and the same light efficiency as that of a three-panel color image display apparatus has been proposed.

Referring to FIGS. 1 and 2, a conventional single-panel color image display apparatus includes a lamp light source 1 for emitting white light, reflecting mirror 2, three dichroic filters 4R, 4G, and 4B which are disposed aslant with respect to one another, a micro lens array 10, and a liquid crystal display device 20.

The lamp light source 1 emits white light in a divergent light form. White light emitted from the lamp light source 1 is converted into parallel light using a condenser lens 3.

White light emitted from the lamp light source 1 is separated into a red light beam R, a green light beam G, and a blue light beam B by the three dichroic filters 4R, 4G, and 4B. The dichroic filter 4R reflects a red light beam R from white light emitted from the light source 1 and transmits remaining light beams. The dichroic filter 4G reflects a green light beam G from the remaining light beams passing through the dichroic filter 4R and transmits a remaining light beam, that is, a blue light beam B. The dichroic filter 4B reflects the blue light beam B.

Each of the three dichroic filters 4R, 4G and 4B is disposed aslant at an angle of +θ with respect to one other. In other words, the dichroic filter 4R is disposed aslant at an angle of −θ with respect to the dichroic filter 4G, and the dichroic filter 4B is disposed aslant at an angle of +θ with respect to the dichroic filter 4G. As used herein, "+" indicates the counterclockwise direction, and "−" indicates the clockwise direction.

Accordingly, a primary ray of the red light beam R is incident on the micro lens array 10 at an angle of −θ with respect to a primary ray of the green light beam G, and a primary ray of the blue light beam B is incident on the micro lens array 10 at an angle of +θ with respect to a primary ray of the green light beam G.

The micro lens array 10 is formed by arranging a plurality of cylindrical lenses forming a unit micro lenses 10a in a horizontal direction. The micro lens array 10 condenses the R, G, and B colored light beams, which are incident at different angles, on signal electrodes 21R, 21G, and 21B, respectively, of the liquid crystal display device 20 in a striped pattern.

The liquid crystal display device 20 has a structure in which a liquid crystal layer 23 is sandwiched between two transparent glass substrates 24 and 25. Transparent conductive films 22 and the signal electrodes 21R, 21G, and 21B are formed on both sides of the liquid crystal layer 23 in a matrix structure.

In the conventional single-panel color image display apparatus having the above structure, R, G, and B stripes, which are obtained by separating white light into three primary colors using the three dichroic filters 4R, 4G, and 4B and condensed on the signal electrodes 21R, 21G, and 21B of the liquid crystal display device 20, are arranged at constant intervals in a horizontal direction due to differences in the incident angles of the chief rays of the R, G, and B colored light beams corresponding to the signal electrodes 21R, 21G, and 21B for the R, G, and B colored light beams. The R, G, and B signal electrodes 21R, 21G, and 21B are subpixels and constitute a single image pixel.

When three subpixels corresponding to three primary colors, that is, R, G, and B colors correspond to the unit micro lenses 10a, and the three subpixels form an image on a screen 7, by a field lens 5 and a projection lens 6, a set of the three subpixels appears as a single image pixel.

Since the three dichroic filters 4R, 4G, and 4B separate white light emitted from the light source 1 into R, G, and B colored light beams and the R, G, and B colored light beams are reflected in an R, G, and B order in the conventional single-panel color image display apparatus having the above structure, a color gamut is narrow.

Referring to the spectroscopic feature of the light source 1, the intensity of the green light beam G is the strongest and the intensity of the blue light beam B also is strong, but the intensity of the red light beam R is relatively weak.

However, in a case where the dichroic filter 4R for reflecting the red light beam R is the first disposed among the three dichroic filters, as in the conventional single-panel color image display apparatus, a considerable amount of the green light beam G, for example, together with the red light beam R are reflected by the dichroic filter 4R so that the green light beam G is mixed in the red light beam R.

Since the human eye is very sensitive to the green light beam G, the mixture of the green light beam G and the red light beam R makes an accurate color realization difficult, and a color gamut that can be expressed by the color image display apparatus narrows. A color gamut indicates a range of reproducible chromaticity. Thus, a narrow color gamut refers to a small number of reproducible colors.

Further, since three subpixels constitute a single image pixel in the conventional single-panel color image display apparatus, the resolution of the liquid crystal display device 20 is reduced by about one-third. Accordingly, in order to realize the same resolution as single-panel color image display apparatuses using a color wheel, the physical resolution of the liquid crystal display device 20 would need to be increased three times.

As described above, the light efficiency of a single-panel image display apparatus using a color wheel is reduced to one-third of that of a three-panel color image display apparatus. A single-panel image display apparatus using a color scrolling technique has been proposed to solve this problem, as shown in FIG. 3.

When the color scrolling technique is used, a single-panel color image display apparatus has the same light efficiency as that of a three-panel color image display apparatus. Further, the resolution reduction generated in the conventional single-panel image display apparatus shown in FIG. 1 is solved.

In the color scrolling technique, white light is separated into R, G, and B colored light beams and the three colored light beams are sent to different locations on a micro display, thereby forming R, G, and B color bars. The color bars are moved at a constant speed in a particular method so that a color image can be formed by reaching all of R, G, and B colored light beams for each pixel.

In a conventional single-panel image display apparatus shown in FIG. 3, white light emitted from a lamp light source 30 passes through first and second lens arrays 32 and 34 and a polarized beam splitter array 35 and is condensed on a condensing lens 37. The white light is separated into R, G, and B colored light beams by first through fourth dichroic filters 39, 42, 69, and 52 and the R, G, and B colored light beams are combined.

More specifically, the red light beam R and the green light beam G are transmitted through the first dichroic filter 39 and travel along a first optical path I1, while the blue light beam B is reflected by the first dichroic filter 39 and travels along a second optical path I2. The red light beam R and the green light beam G on the first light path I1 are separated by the second dichroic filter 42. The red light beam R is transmitted by the second dichroic filter 42 and travels along the first light path I1. The green light beam G is reflected by the second dichroic filter 42 and travels along the third light path I3.

The green light beam G and the blue light beam B that travel along the second and third optical paths I2 and I3, respectively, are transmitted and reflected by the third dichroic filter 69, respectively, and then combined. Finally, the R, G, and B colored light beams are combined by the fourth dichroic filter 52. The combined colored light beam passes through a polarized beam splitter 57 and is incident on a micro display 60.

First through third prisms 44, 65 and 72 are disposed on the first through third optical paths I1, I2, and I3, respectively, and rotate at a uniform speed such that R, G, and B color bars are formed on the micro display 60 and scrolled due to the rotation of the first through third prisms 44, 65 and 72.

As described above, in the process of separating and combining the white light emitted from the light source 30 by the first through fourth dichroic filters 39, 42, 69, and 52, the conventional single-panel image display apparatus performs color scrolling by rotating the first through third prisms 44, 65 and 72 disposed on the first through third optical paths I1, I2, and I3.

The scrolling of the R, G, and B color bars due to rotation of the first through third prisms 44, 65, and 72 is shown in FIG. 4. FIG. 4 shows the movement of the R, G, and B color bars e.g., formed on a surface of the micro display 60 when the prisms 44, 65, and 72 corresponding to each color are synchronously rotated.

When processing image information with respect to each pixel of the micro display 60 to synchronize with the movement of the R, G, and B color bars, an image is formed. The formed image is magnified by a projecting lens (not shown) and projected on a screen (not shown).

As described above, the conventional single-panel image display apparatus has a structure in which light is separated into individual colored light beams and the separated colored light beams are combined again. Relay lenses 41, 47, 50, 54, 61, 67, 70, and 75 are disposed on optical paths between optical components send light to the polarized beam splitter 57. Accordingly, optical paths are complicated and multiple components are used so that the conventional single-panel image display apparatus has a large optical system and an assembling process of the optical system is difficult.

Further, since the color scrolling is performed due to the individual rotation of the three prisms 44, 65, and 72, it is difficult to synchronize the driving of the micro display 60 with the three prisms 45, 65, and 72.

That is, the color bars as shown in FIG. 4 must be moved at a constant speed in order to form a color image using the color scrolling technique. However, since the conventional single-panel image display apparatus must synchronize the micro display 60 with the three prisms 44, 65, and 72 in order to perform the scrolling, the control of the synchronization is difficult. Further, since the three prisms 44, 65, and 72 are rotated, the color scrolling speed is irregular, thereby deteriorating the quality of an image.

In addition, a large amount of noise is generated due to the driving of three motors for rotating the three prisms 44, 65, and 72, and the manufacturing costs of the conventional single-panel image display apparatus using three motors are greater compared to a color wheel method using only one motor.

SUMMARY OF THE INVENTION

The present invention provides a single-panel color image display apparatus that can enable a wide color gamut even if a colored light separator having a plurality of dichroic filters is used.

The present invention also provides a single-panel color image display apparatus including a small optical system of a simple structure to perform color scrolling while realizing a wide color gamut.

According to an aspect of the present invention, a single-panel color image display apparatus is provided comprising a light source, a colored light separator having a plurality of dichroic filters of reflective type for separating light emitted from the light source according to wavelength, a dichroic filter reflecting a red light beam being disposed lastly among the plurality of dichroic filters, and a micro display controlling light emitted from the light source and separated by the colored light separator according to color, on a pixel-by-pixel basis according to an input image signal and forming a color image.

According to another aspect of the invention, the colored light separator includes three dichroic filters reflecting incident light in an order of a blue light beam, a green light beam, and a red light beam or in an order of a green light beam, a blue light beam, and a red light beam. The three dichroic filters may be parallel to one another. The single-panel color image display apparatus may further comprise a collimating lens focusing light emitted from the light source into parallel light.

According to another aspect of the invention, the single-panel color image display apparatus further comprises a scrolling unit formed by spirally arranging an array of lens cells and obtaining the effect of a linear motion of a lens array due to the rotation of the spiral array of the lens cells so that a scrolling operation is performed. The lens cells of the scrolling unit may have a cross-section of an arc shape.

According to another aspect of the invention, a mask is formed at a boundary portion between the lens cells of the scrolling unit to prevent color mixture among the R, G, and B colored light beams. The scrolling unit may be disposed between the light source and the colored light separator.

According to another aspect of the invention, the single-panel color image display apparatus further comprises first and second lens arrays which are disposed between the scrolling unit and the micro display.

According to another aspect of the invention, the single-panel color image display apparatus further comprises a relay lens which is disposed between the second lens array and the micro display.

According to another aspect of the invention, a distance among the plurality of dichroic filters is set such that colored light beams separated by the colored light separator are incident on the same lens cell of the first lens array without a color mixture occurring among the colored light beams.

According to another aspect of the present invention, a single-panel color image display apparatus is provided comprising a light source, a colored light separator separating light emitted from the light source according to wavelength, a scrolling unit formed by spirally arranging an array of lens cells and obtaining the effect of a linear motion of a lens array due to the rotation of the spiral array of the lens cells so that scrolling operation is performed, the scrolling unit having a mask formed at a boundary portion between the lens cells of the scrolling unit to prevent color mixture among colored light beams; and a micro display controlling light emitted from the light source, separated by the colored light separator according to color, and scrolled on a pixel-by-pixel basis according to an input image signal and forming a color image.

Additional aspects and advantages of the invention will be set forth in part in the description which follows and, in part, will be obvious from the description, or may be learned by practice of the invention.

BRIEF DESCRIPTION OF THE DRAWINGS

These features and/or other aspects and advantages of the invention will become apparent and more readily appreciated from the following description of the embodiments taken in conjunction with accompanying drawings in which.

DETAILED DESCRIPTION OF THE INVENTION

Figure 1:
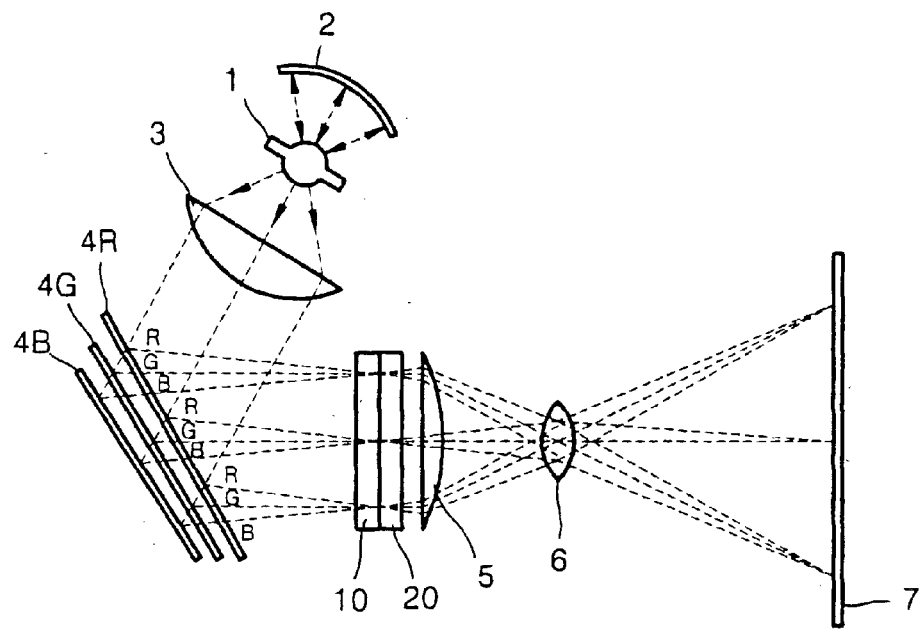
FIG. 1 shows a conventional single-panel color image display apparatus including a colored light separator having three dichroic filters.
Figure 2:
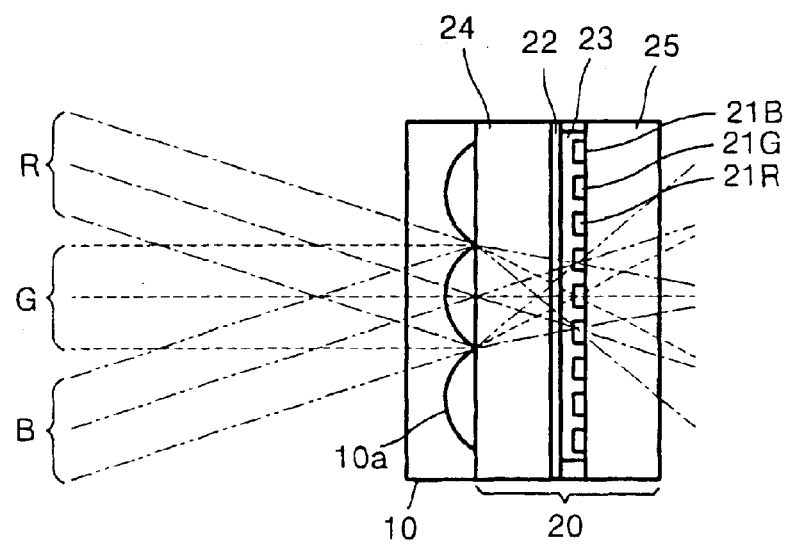
FIG. 2 shows an optical path of light rays in a micro lens array and a liquid crystal display device for the single-panel color image display apparatus of FIG. 1.
Figure 3:
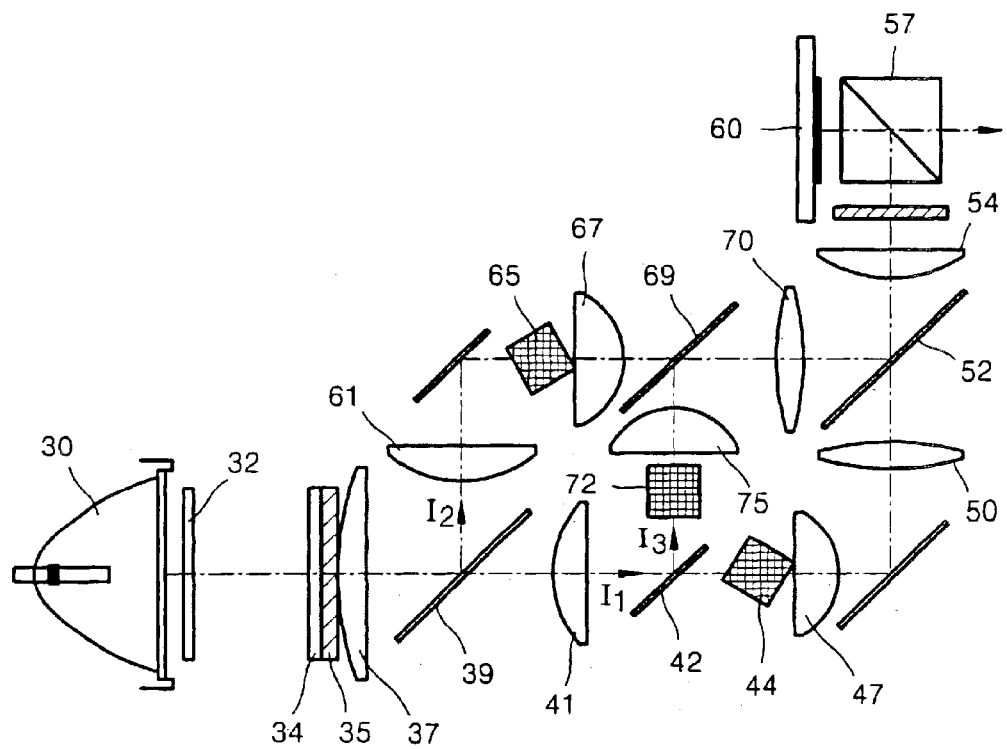
FIG. 3 shows a conventional single-panel color image display apparatus using a color scrolling technique.

Reference will now be made in detail to the embodiments of the present invention, examples of which are illustrated in the accompanying drawings wherein like reference numerals refer to the like elements throughout. The embodiments are described below in order to explain the present invention by referring to the figures.

Figure 5:
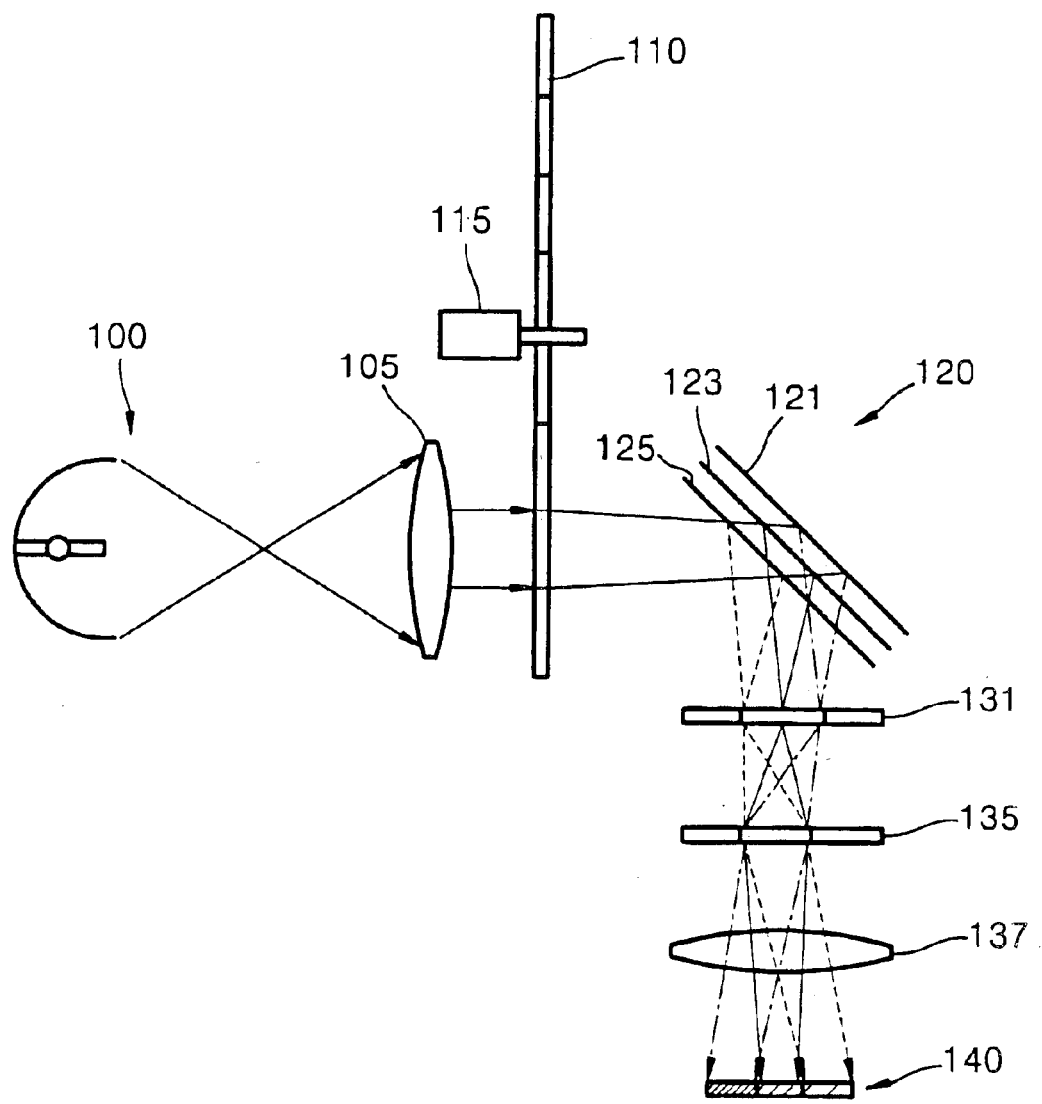
FIG. 5 is a schematic structure diagram of a single-panel color image display apparatus according to one aspect of the present invention.

Referring to FIG. 5, a single-panel color image display apparatus according to one aspect of the present invention includes an illuminating unit, a colored light separator 120 separating light emitted from the illuminating unit according to color, and a micro display 140 controlling light on a pixel-by-pixel basis according to an input image signal and forming a color image.

According to one aspect of the present invention, the single-panel color image display apparatus includes a scrolling unit 110 performing color scrolling.

First and second lens arrays 131 and 135 may be provided on an optical path between the scrolling unit 110 and the micro display 140. Further, a relay lens 137 may be provided between the second lens array 135 and the micro display 140.

The illuminating unit includes a light source 100 generating and emitting white light. As shown in FIG. 5, a lamp light source having a reflecting mirror may be used as the light source 100. The single-panel color image display apparatus according to the present invention shown in FIG. 5 includes the light source emitting convergent light, and a collimating lens 105 focusing diverging light emitted from the light source 100 into parallel light. The light source 100 may be configured to directly emit parallel light. The light source 100, and the light unit including the light source 100, can be variously modified.

Light emitted from the light source 100 is separated into a red light beam R, a green light beam G, and a blue light beam B by the colored light separator 120.

The colored light separator 120 includes a plurality of dichroic filters of a reflective type in order to separate light emitted from the light source 100 according to wavelength. The single-panel color image display apparatus according to one aspect of the present invention is characterized in that a dichroic filter reflecting a red light beam R is disposed lastly among the plurality of dichroic filters in consideration of the spectroscopic feature of the lamp used as the light source 100 and the color sensitivity of the human's eye so that a wide color gamut can be realized. A wide color gamut refers to a large number of reproducible colors.

For example, the colored light separator 120 may include first, second, and third dichroic filters 121, 123, and 125 separating white light emitted from the light source 100 into a red light beam R, a green light beam G, and a blue light beam B, respectively. According to one aspect of the present invention, the first, second, and third dichroic filters 121, 123, and 125 reflect a red light beam R, a green light beam G, and a blue light beam B, respectively, and transmit other colored light beams.

According to one aspect of the present invention, the first, second, and third dichroic filters 121, 123, and 125 are arranged to reflect colored light beams in a B, G, and R order. That is, as shown in FIG. 5, the first, second, and third dichroic filters 121, 123, and 125 are arranged in order of the third, second, and first dichroic filters 125, 123, and 121 from the light source 100.

When white light emitted from the light source 100 is incident on the colored light separator 120 having the first, second, and third dichroic filters 121, 123, and 125 arranged as presented above, the third dichroic filter 125 reflects a blue colored light beam B, from the white incident light and transmits light of other wavelengths. The second dichroic filter 123 reflects the green colored light beam G from the light beams transmitted by the third dichroic filter 125 and transmits light of other wavelengths, that is, the red light beam R. The first dichroic filter 121 reflects the red light beam R transmitted by the third and second dichroic filters 125 and 123.

In the single-panel color image display apparatus according to one aspect of the present invention, the colored light separator 120 may be configured to reflect colored light beams in a G, B, and R order.

If the first, second, and third dichroic filters 121, 123, and 125 are arranged to reflect the red light beam R lastly, the green light beam G or the blue light beam B can be prevented from being mixed in the red light beam R. Thus, a color gamut is prevented from being narrow due to the color mixture among the R, G, B colored light beams. That is, a sufficiently wide color gamut can be realized in the single-panel color image display apparatus according to one aspect of the present invention.

According to one aspect of the present invention, a distance among the first, second, and third dichroic filters 121, 123, and 125 is set such that colored light beams separated by the colored light separator 120 are incident on the same lens cell of the first lens array 131 without color mixture among the R, G, B colored light beams.

In FIG. 5, the first, second, and third dichroic filters 121, 123, and 125 are disposed parallel to one another, but the first, second, and third dichroic filters 121, 123, and 125 alternatively may be disposed aslant with respect to one another.

Figure 6:
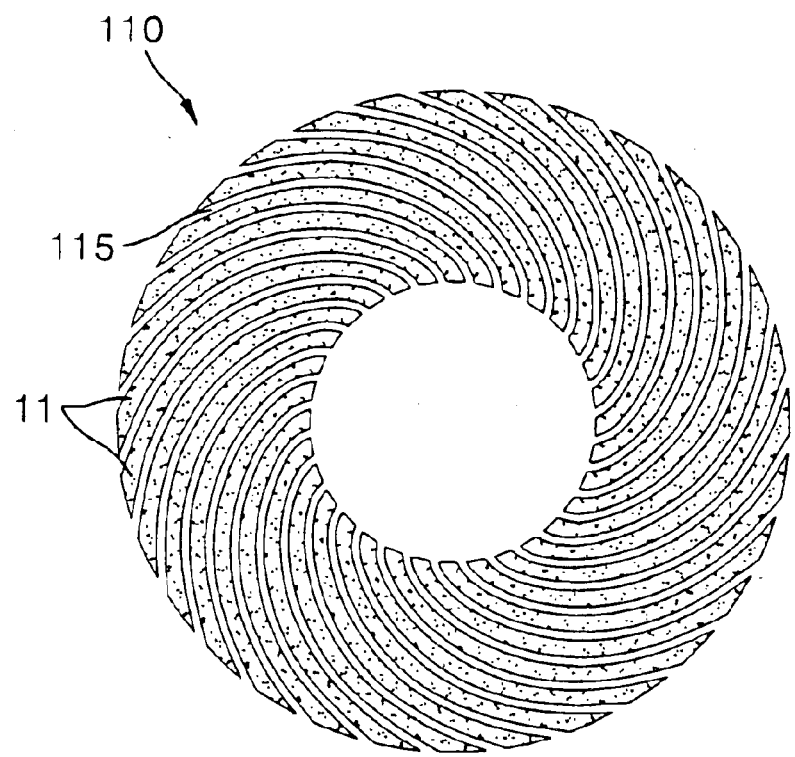
FIG. 6 is a schematic structure diagram of a scrolling unit used in the single-panel color image display apparatus according to one aspect of the present invention.

The scrolling unit 110, as shown in FIG. 6, has a disc structure in which an array of lens cells 111 is spirally formed, obtaining an effect of a linear motion of a lens array due to the rotation of the scrolling unit 110. According to one aspect of the invention, the lens cells 111 are at constant intervals and have the same cross-section.

Figure 7:
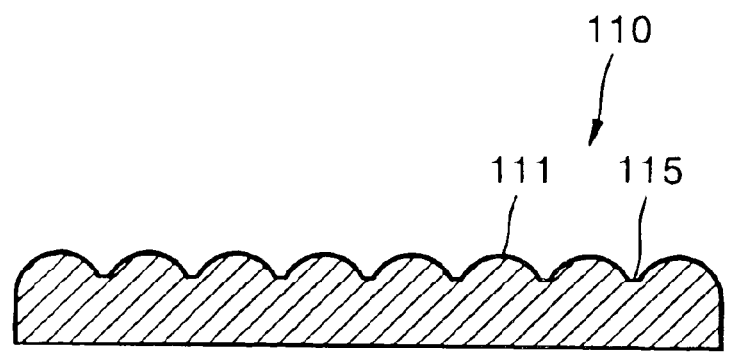
FIG. 7 is a cross-sectional view of the scrolling unit of FIG. 6.

For example, the lens cells 111 of the scrolling unit 110, as shown in FIG. 7, may be cylindrical lens cells whose cross-section shapes are an arc. Alternatively, the lens cells 111 of the scrolling unit 110 can be either a diffractive optical element or a hologram optical element.

The lens cells 111 of the scrolling unit 110 operate as a condensing lens for condensing parallel light incident from the light source 100. When the scrolling unit 110 having the spiral array of the lens cells 111 is rotatably driven using a motor, the rotation of the spiral array of the lens cells 111 makes an effect of a linear motion of a lens array so that a color scrolling is performed.

In other words, since the array of the lens cells 111 is formed spirally, if the scrolling unit 110 rotates at a constant speed, as seen from the viewpoint of a light beam passing through a predetermined location of the scrolling unit 110, the effect generated is that of a cylindrical lens array continuously moving upward or downward at a constant speed. Since a light beam having a narrow width passes through the scrolling unit 110, the effect of a light beam passing through a cylindrical lens array moving linearly can be obtained from the light beam passing through the scrolling unit 110.

Accordingly, as the scrolling unit 110 rotates at a constant speed, R, G, and B colored light beams are repeatedly scrolled so that color bars are formed on the micro display 140.

Where the scrolling unit 110 is provided as described above, since the scrolling unit 110 continuously rotates in one direction, continuity and consistency of color scrolling can be substantially guaranteed. In addition, since color bars are scrolled using a single scrolling unit 110, the scrolling speed of the color bars is advantageously kept substantially constant.

The number of scrolling unit cells 111 on the scrolling unit 110 or the rotation speed of the scrolling unit 110 can be modified to synchronize the scrolling unit 110 with the operating frequency of the micro display 140. For example, if the operating frequency of the micro display 140 is high, more lens cells may be included so that the scrolling speed can be controlled to be faster while keeping the rotation speed of the scrolling unit 110 constant. Alternatively, the scrolling speed can be controlled to be faster by increasing the rotation frequency of the scrolling unit 110 without changing the number of scrolling unit cells 111. According to one aspect of the present invention, a method for scrolling includes rotating a spiral array and passing light through the rotating array.

According to one aspect of the present invention, the scrolling unit 110 includes masks 115 at boundary portions between the lens cells 111 intercepting transmittance of light in order, defining a boundary between color bars formed on the micro display 140 and preventing color mixture among the R, G, B color bars. If the masks 115 are placed at the boundary portions between the lens cells 111 as presented above, color mixture by the boundary portions between the lens cells 111 is prevented so that the color gamut is wide.

Although the single-panel color image display apparatus according to one aspect of the present invention shown in FIG. 5 includes the single scrolling unit 110, the single-panel color image display apparatus according to the present invention may include a greater number of scrolling units, as needed. In a case where the single-panel color image display apparatus includes two scrolling units, the two scrolling units are installed on the same driving axis so that color scrolling can be performed. Thus, the speed of the color scrolling can be kept constant.

In a case where the first, second, and third dichroic filters 121, 123, and 125 of the colored light separator 120 are disposed parallel to one another, the scrolling unit 110, as shown in FIG. 5, may be disposed between the light source 100 and the colored light separator 120 so that light condensed by the scrolling unit 110 is separated by the colored light separator 120. According to one aspect of the present invention, R, G, and B colors are not mixed due to differences in the lengths of optical paths of the R, G, and B colored light beams caused by the selective reflection of the first, second, and third dichroic filters 121, 123, and 125, and are incident on the first lens array 131.

According to one aspect of the present invention, the first, second, and third dichroic filters 121, 123, and 125 of the colored light separator 120 are disposed aslant with respect to one another and the scrolling unit 110 is disposed between the colored light separator 120 and the micro display 140. Lens cells of each of the first and second lens arrays 131 and 135 match with each other in a one-to-one correspondence, and the first and second lens arrays 131 and 135 may be a fly's eye lens array. The lens cells of the first and second lens arrays 131 and 135 match the lens cells 111 of the scrolling unit 110 in a one-to-one correspondence.

The R, G, and B colored light beams, focused by the lens cells 111 of the scrolling unit 110 used as a focusing lens and separated by the first, second, and third dichroic filters 121, 123, and 125 of the colored light separator 120, have different lengths of optical paths due to the first, second, and third dichroic filters 121, 123, and 125 being separated from one another, thereby focusing at different locations of the same lens cell of the first lens array 131.

The R, G, and B colored light beams are converted into divergent light by the first lens array 131 and are formed into parallel light by the second lens array 135. The parallel R, G, and B colored light beams passing through the first and second lens arrays 131 and 135, and the relay lens 137, are incident at different locations on the micro display 140. The relay lens 137 may be constituted as a single lens as shown in FIG. 5, or alternately the relay lens 137 may be constituted of a lens group including two or more lenses.

Where the first and second lens arrays 131 and 135 and the relay lens 137 are provided, colored light beams condensed on the scrolling unit 110 are sent by the first and second lens arrays 131 and 135 in a one-to-one correspondence and R, G, and B color bars are formed on the micro display 140 by the relay lens 137. The micro display 140 controls the on/off operation of R, G, and B colored light beams irradiated in a color bar form according to an input image signal, thereby forming a color image.

Figure 4:
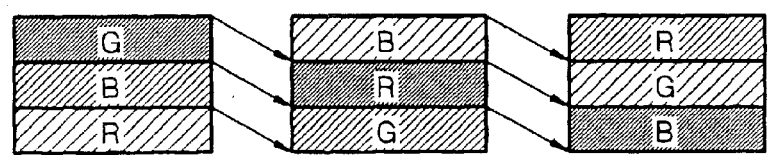
FIG. 4 is a diagram explaining a color scrolling operation.

The R, G, and B color bars on the micro display 140 are scrolled as shown in FIG. 4 according to the rotation of the scrolling unit 110. Thus, the micro display 140 processes image information for each pixel to synchronize with the movement of the R, G, and B color bars, thereby forming a color image. The color image is magnified by a projecting lens (not shown) landing on a screen (not shown).

As described above, since the single-panel color image display apparatus according to the present invention includes the colored light separator 120 having three dichroic filters 121, 123, and 125 disposed to reflect a red light beam R lastly, and/or the scrolling unit 120 having lens cells 111 with masks 115 at the boundary portions therebetween, a wide color gamut can be realized. FIG. 5 only shows one example of the single-panel color image display apparatus according to the present invention, but the present invention is not limited to the optical structure of FIG. 5.

As described above, since a single-panel color image display apparatus according to one aspect of the present invention includes a colored light separator having a plurality of dichroic filters disposed to reflect a red light beam lastly, and/or a scrolling unit having lens cells with masks formed at boundary portions therebetween, a wide color gamut can be realized.

Further, since the single-panel color image display apparatus according to the present invention performs color scrolling using the scrolling unit having a spiral array of the lens cells, the single-panel color image display apparatus includes a small optical system of simple structure, manufacturing cost thereof is reduced, continuity and consistency of the color scrolling can be substantially guaranteed, and the scrolling speed of color bars can be kept substantially constant.

Although a few embodiments of the present invention have been particularly shown and described, it would be appreciated by those skilled in the art that changes may be made therein in these embodiments without departing from the principles and spirit of the invention, the scope of which is defined in the claims and their equivalents.

What is claimed is:

1. A single-panel color image display apparatus comprising:
   a light source emitting light;
   a colored light separator having a plurality of dichroic filters of a reflective type separating the light emitted from the light source according to wavelength, and a dichroic filter reflecting a red light beam being disposed lastly among the plurality of dichroic filters;
   a scrolling unit having a spirally arranged array of lens cells and obtaining an effect of a linear motion of a lens array due to the rotation of the spiral array of the lens cells so that scrolling operation is performed; and
   a micro display controlling the light separated by the colored light separator according to color on a pixel-by-pixel basis according to an input image signal and forming a color image.

2. The single-panel color image display apparatus of claim 1, wherein the colored light separator includes first through third dichroic filters reflecting colored light beams in an order of a blue light beam, a green light beam, and a red light beam or in an order of the green light beam, the blue light beam, and the red light beam, respectively.

3. The single-panel color image display apparatus of claim 2, wherein the first through third dichroic filters are parallel to one another.

4. The single-panel color image display apparatus of claim 2, further comprising a scrolling unit having a spirally arranged array of lens cells and obtaining an effect of a linear motion of a lens array due to the rotation of the spiral array of lens cells, and performing a scrolling operation.

5. The single-panel color image display apparatus of claim 1, wherein the plurality of dichroic filters are parallel to one another.

6. The single-panel color image display apparatus of claim 1, further comprising a collimating lens focusing light emitted from the light source into parallel light.

7. The single-panel color image display apparatus of claim 6, further comprising a scrolling unit having a spirally arranged array of lens cells and obtaining an effect of a linear motion of a lens array due to the rotation of the spiral array of lens cells so that a scrolling operation is performed.

8. The single-panel color image display apparatus of claim 1, wherein the lens cells of the scrolling unit have a cross-section of an arc shape.

9. The single-panel color image display apparatus of claim 8, further comprising a mask at a boundary portion between the lens cells of the scrolling unit, preventing color mixture among the red, green, and blue colored light beams.

10. The single-panel color image display apparatus of claim 1, further comprising a mask at a boundary portion between the lens cells of the scrolling unit, preventing color mixture among the red, green, and blue colored light beams.

11. The single-panel color image display apparatus of claim 1, wherein the scrolling unit is disposed between the light source and the colored light separator.

12. The single-panel color image display apparatus of claim 1, further comprising first and second lens arrays disposed between the scrolling unit and the micro display.

13. The single-panel color image display apparatus of claim 12, further comprising a relay lens disposed between the second lens array and the micro display.

14. The single-panel color image display apparatus of claim 12, wherein a distance among the plurality of dichroic filters is set such that colored light beams separated by the colored light separator are incident on the same lens cell of the first lens array without color mixture among the colored light beams.

15. A single-panel color image display apparatus, comprising:

a light source emitting light;

a colored light separator separating the light emitted from the light source according to wavelength;

a scrolling unit having a spirally arranged array of lens cells and obtaining an effect of a linear motion of a lens array due to a rotation of the spiral array of the lens cells so that scrolling operation is performed, the scrolling unit having a mask at a boundary portion between the lens cells of the scrolling unit, preventing color mixture among colored light beams; and a micro display controlling the light separated by the colored light separator according to color, and scrolled, on a pixel-by-pixel basis, according to an input image signal and forming a color image.

16. A single-panel color image display apparatus, comprising:

a light source emitting light;

a collimating lens focusing the light emitted from the light source;

a spiral array of lens cells scrolling the focused light, the lens cells having a mask at a boundary portion between the lens cells;

a colored light separator separating the scrolled light having a plurality of dichroic filters to separate the scrolling light, each of the plurality of dichroic filters reflecting incident light of a different wavelength, a plurality of lens arrays focusing the separated light; and a micro display displaying the focused light.

17. The single-panel color image display apparatus according to claim 16, wherein the plurality of lens arrays includes cells matched in a one-to-one correspondence or cells in a fly's eye array.

18. The single-panel color image display apparatus according to claim 16, wherein a number of lens cells or a rotation speed of the spiral array being modified to synchronize with an operating frequency of the micro display.

* * * * *